United States Patent
Gundlach et al.

(10) Patent No.: US 6,264,731 B1
(45) Date of Patent: Jul. 24, 2001

(54) INK COMPOSITIONS CONTAINING 1,3,5-TRIOXANE OR TETRAETHYLENE GLYCOL DIMETHYL ETHER

(75) Inventors: Kurt B. Gundlach, Fairport; Richard L. Colt, Rochester, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,019

(22) Filed: Nov. 29, 1999

(51) Int. Cl.7 .................................................. C09D 11/02
(52) U.S. Cl. ................................ 106/31.58; 106/31.86; 106/31.43
(58) Field of Search ........................... 106/31.43, 31.58, 106/31.86

(56) References Cited

U.S. PATENT DOCUMENTS

| | | | |
|---|---|---|---|
| 4,197,135 | 4/1980 | Bailey et al. | 106/31.43 |
| 4,231,841 | 11/1980 | Calmanti et al. | 162/5 |
| 4,267,088 | 5/1981 | Kempf | 523/420 |
| 4,391,639 | 7/1983 | Kobayashi | 106/31.52 |
| 4,659,382 | 4/1987 | Kang | 106/31.43 |
| 4,961,785 | 10/1990 | Skene et al. | 106/31.43 |
| 5,017,224 | 5/1991 | Tomita et al. | 106/31.43 |
| 5,019,164 | 5/1991 | Tomita et al. | 106/31.43 |
| 5,019,166 | 5/1991 | Schwarz | 106/31.43 |
| 5,059,246 | 10/1991 | Yamamoto et al. | 106/31.58 |
| 5,091,005 | 2/1992 | Mueller et al. | 106/31.43 |
| 5,116,410 | 5/1992 | Miller | 106/31.58 |
| 5,156,675 | 10/1992 | Breton et al. | 106/31.43 |
| 5,206,071 | 4/1993 | Atherton et al. | 428/195 |
| 5,223,338 | 6/1993 | Malhotra | 428/342 |
| 5,250,107 | 10/1993 | Bares | 106/31.27 |
| 5,262,535 | 11/1993 | Kaiser | 544/402 |
| 5,271,765 | 12/1993 | Ma | 524/83 |
| 5,292,441 | 3/1994 | Chen et al. | 210/735 |
| 5,358,558 * | 10/1994 | Yamamoto et al. | 106/31.58 |
| 5,509,957 | 4/1996 | Toan et al. | 106/31.43 |
| 5,518,534 | 5/1996 | Pearlstine et al. | 106/31.75 |
| 5,531,818 | 7/1996 | Lin et al. | 106/31.28 |
| 5,603,756 * | 2/1997 | Suzuki et al. | 106/31.58 |
| 5,618,338 | 4/1997 | Kurabayashi et al. | 106/31.37 |
| 5,626,655 | 5/1997 | Pawlowski et al. | 106/31.27 |
| 5,667,572 | 9/1997 | Taniguchi et al. | 106/31.36 |
| 5,698,478 | 12/1997 | Yamamoto et al. | 442/153 |
| 5,709,737 | 1/1998 | Malhotra et al. | 106/31.43 |
| 5,746,818 | 5/1998 | Yatake | 106/31.86 |
| 5,788,750 | 8/1998 | Gundlach et al. | 106/31.27 |
| 5,788,753 * | 8/1998 | Pawlowski et al. | 106/31.43 |
| 5,853,469 | 12/1998 | Colt et al. | 106/31.49 |
| 5,861,447 | 1/1999 | Nagasawa et al. | 523/161 |
| 5,958,121 | 9/1999 | Lin | 106/31.43 |
| 5,972,082 * | 10/1999 | Koyano et al. | 106/31.27 |
| 6,013,124 * | 1/2000 | Saibara et al. | 106/31.86 |

FOREIGN PATENT DOCUMENTS 57-198768  12/1982  (JP).
08009701  1/1996  (JP).

* cited by examiner

*Primary Examiner*—Helene Klemanski
*Assistant Examiner*—Veronica F. Faison
(74) *Attorney, Agent, or Firm*—Judith L. Byorick

(57) ABSTRACT

Disclosed is an ink composition comprising (a) water, (b) a colorant, and (c) 1,3,5-trioxane or tetraethylene glycol dimethyl ether.

32 Claims, No Drawings

INK COMPOSITIONS CONTAINING 1,3,5-TRIOXANE OR TETRAETHYLENE GLYCOL DIMETHYL ETHER

BACKGROUND OF THE INVENTION

The present invention is directed to ink compositions and to methods for the use thereof. More specifically, the present invention is directed to ink compositions suitable for use in ink jet printing processes. One embodiment of the present invention is directed to an ink composition comprising (a) water, (b) a colorant, and (c) 1,3,5-trioxane or tetraethylene glycol dimethyl ether.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficient high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describe an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 ( May 1, 1989) and references therein, the disclosure of which is totally incorporated herein by reference.

U.S. Pat. No. 5,250,107 (Bares), the disclosure of which is totally incorporated herein by reference, discloses a water-fast ink composition and method for making the same. A selected chemical dye having at least one functional group with an extractable hydrogen atom thereon (e.g. —COOH, —NH$_2$, or —OH) is combined with an ammonium zirconium polymer salt (e.g. ammonium zirconium carbonate, ammonium zirconium acetate, ammonium zirconium sulfate, ammonium zirconium phosphate, and ammonium zirconium oxalate). The resulting mixture preferably contains about 0.01–5.0% by weight ammonium zirconium polymer salt and about 0.5–5.0% by weight chemical dye. Upon dehydration of the mixture, the ammonium zirconium polymer salt and chemical dye form a cross-linked dye complex which is stable and water-fast. The mixture may be dispensed onto a variety of substrates (e.g. paper) using thermal ink jet or other printing systems.

U.S. Pat. No. 4,267,088 (Kempf), the disclosure of which is totally incorporated herein by reference, discloses coatings particularly useful as marking inks in which an epichlorohydrin-modified polyethyleneimine and an ethylene oxide-modified polyethyleneimine cooperate in aqueous solution to form a composition capable of application to form deposits adherent to most materials and resistant to most organic solvents but readily removable by water.

U.S. Pat. No. 4,197,135 (Bailey et al.), the disclosure of which is totally incorporated herein by reference, discloses an ink for use in ink jet printers containing a water soluble dye and a polyamine containing 7 or more nitrogen atoms per molecule, with the ink composition having a pH of 8 or above, the upper pH limit being dye decomposition dependent. The ink has improved waterfastness over an equivalent ink formulation without the polyamine additive.

U.S. Pat. No. 4,659,382 (Kang), the disclosure of which is totally incorporated herein by reference, discloses an ink jet ink composition comprising a major amount of water, a hydroxyethylated polyethyleneimine polymer, and a dye component, wherein the polymer has incorporated therein from about 65 to about 80 percent by weight of hydroxyethyl groups.

U.S. Pat. No. 5,091,005 (Mueller et al.), the disclosure of which is totally incorporated herein by reference, discloses inks comprising, by weight, from about 4% to about 10% formamide, from about 1% to about 10% dye, and the balance water when printed on paper from an ink-jet printer have improved resistance to bleed, especially when printed at a rote up to about 3.7 kHz.

U.S. Pat. No. 4,961,785 (Skene et al.), the disclosure of which is totally incorporated herein by reference, discloses inks for ink-jet printing have improved smear resistance when they contain from about 15 to 50%, preferably from about 20% to about 30%, formamide.

Japanese Pat. No. Publication 57-198768, the disclosure of which is totally incorporated herein by reference, discloses a type of water-base ink made of acidic dye and/or direct dye, cationic water-soluble resin, water-soluble organic solvent, and water.

U.S. Pat. No. 5,853,469 (Colt et al.), the disclosure of which is totally incorporated herein by reference, discloses an ink composition which comprises water, a colorant, and an additive selected from imidazolium formate, imidazolium phosphite, and mixtures thereof. Another embodiment of the invention includes a process which entails incorporating an ink composition of the present invention into an ink jet printing apparatus and causing droplets of the ink composition to be ejected in an imagewise pattern onto a substrate. In one preferred embodiment, the printing apparatus employs a thermal ink jet process wherein the ink in the nozzles is selectively heated in an imagewise pattern, thereby causing droplets of the ink to be ejected in imagewise pattern. In another preferred embodiment, the ink is used in a printing process which employs microwave drying of the printed image.

U.S. Pat. No. 5,019,164 (Tomita et al.), the disclosure of which is totally incorporated herein by reference, discloses a water resistant ink composition having a greatly improved water resistance and being excellent in resistance to drying-up, age stability, and smooth ink flowability containing a mixture of polyamine compound having only primary amino groups and a molecular weight of 300 or more and a polyamine having primary amino groups removed therefrom, that is, having only secondary and/or tertiary amino groups and a molecular weight of 300 or more and combined with an anionic dye and a stabilizing agent such as urea or the like.

U.S. Pat. No. 5,262,535 (Kaiser), the disclosure of which is totally incorporated herein by reference, discloses the reaction product of: (a) a compound of the formula

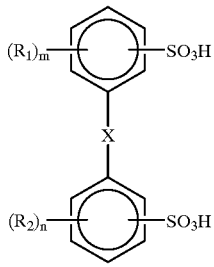

wherein X is a member selected from the group consisting of N, O, and S; $R_1$ and $R_2$ are independently a straight or branched, saturated or unsaturated non-aromatic hydrocarbon of four to eighteen carbon atoms; m is 1 or 2; and n is 0, 1 or 2; and (b) a compound selected from the group consisting of primary, secondary, tertiary and higher amines, which are liquid at room temperature. The reaction product has excellent surfactant properties, and is suitable for use in coloring compositions to improve the fugitivity from skin and clothing. The reaction product is also useful as a cleansing agent.

U.S. Pat. No. 4,391,639 (Kobayashi), the disclosure of which is totally incorporated herein by reference, discloses a recording liquid characterized by containing as a dye a compound represented by the formula

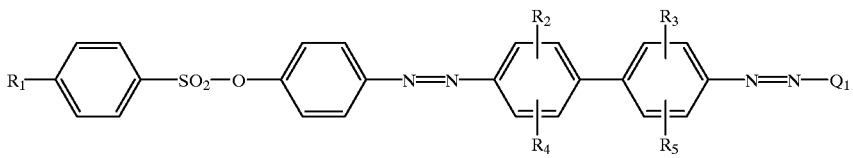

wherein $R_1$ represents hydrogen or $C_1-C_2$ alkyl, R2 and R3 each represent hydrogen, $C_1-C_2$ alkyl, or $C_1-C_2$ alkoxy, $R_4$ and $R_5$ represent hydrogen or sulfo in salt form with base, and $Q_1$ represents naphthyl substituted by hydroxyl and by sulfo in salt form with base.

U.S. Pat. No. 5,059,246 (Yamamoto et al.), the disclosure of which is totally incorporated herein by reference, discloses a recording liquid comprising a coloring material and a liquid medium containing water and a water-soluble organic solvent having an ether bond, and a pH value of said recording liquid being from 3 to 9 and a peroxide concentration of the liquid medium being not more than 4 mmol/l in terms of iodine. Also disclosed is an ink jet recording process that performs recording by ejecting the recording liquid in the form of droplets from a minute ejection orifice, to a recording medium by the action of heat energy.

U.S. Pat. No. 5,788,750 (Gundlach et al.), the disclosure of which is totally incorporated herein by reference, discloses an ink composition which comprises water, a colorant, a nonionic surfactant, and a fluorinated material selected from the group consisting of (a) those of the formula $[(F_{2n+1}C_nCH_2S)_2(CH_3) C-CH_2CH_2COO-][B^+]$, wherein n is an integer of from about 8 to about 20 and B is a cation, and (b) those of the formula $[(F_3C(F_2C)_n CH=CHCH_2OCH(OH)CH_2)_2NCH_2COO-][X^+]$, wherein X is a cation. Also disclosed are ink jet printing processes employing the aforementioned ink.

U.S. Pat. No. 5,746,818 (Yatake), the disclosure of which is totally incorporated herein by reference, discloses an ink for ink jet recording which can form a record having a high color density, free from the occurrence of bleeding or feathering even on recycled paper, and possessing water resistance. An ink composition comprising a pigment dispersible and/or soluble in water without the aid of any dispersant and a glycol ether selected from the group consisting of diethylene glycol mono-n-butyl ether, triethylene glycol mono-n-butyl ether, propylene glycol mono-n-butyl ether, and dipropylene glycol mono-n-butyl ether can realize a print having no significant bleeding or feathering. Further, a high-quality image having much less bleeding or feathering can be realized by an ink jet recording method wherein a reaction solution, containing a reactant, capable of breaking the state of dispersion and/or dissolution of a pigment in the ink composition is brought into contact with the ink composition.

U.S. Pat. No. 5,709,737 (Malhotra et al.), the disclosure of which is totally incorporated herein by reference, discloses an ink composition which comprises an aqueous liquid vehicle, a colorant, and an additive material selected from the group consisting of (a) symmetric acetylenic bisester alcohols, (b) symmetric acetylenic bisalkyl alcohols and acetylenic bisalkoxy alcohols, (c) symmetric acetylenic bisamido alcohols, (d) symmetric bisamido alcohols, (e) mono amido alcohols, (f) trialkyihydroxy compounds, (g) derivatives of 1,2-diols and 1,3-diols, (h) thio diols, (i) aromatic diols, (j) heterocyclic diols, (k) imino alcohols, (l) salts of hydroxyl compounds, (m) saccharides and saccharide derivatives, and (n) mixtures thereof. Also disclosed is an ink jet process which comprises (1) incorporating into a thermal ink jet printing apparatus the aforementioned ink composition; and (2) causing droplets of the ink to be ejected from the printing apparatus in an imagewise pattern onto a substrate, thereby generating images on the substrate. Further disclosed is an ink jet printing process which comprises (1) incorporating into a thermal ink jet printing apparatus the aforementioned ink composition; (2) causing droplets of the ink to be ejected from the printing apparatus in an imagewise pattern onto a substrate, thereby generating images on the substrate; and (3) exposing the substrate to microwave radiation, thereby drying the images on the substrate.

U.S. Pat. No. 5,698,478 (Yamamoto et al.), the disclosure of which is totally incorporated herein by reference, discloses an ink jet printing cloth which can be dyed with inks containing a reactive dye and is composed mainly of cellulose fiber, wherein the cloth contains 0.1 to 50 percent by weight of a cationic substance, 0.01 to 5 percent by weight of an alkaline substance, and 0.01 to 20 percent by weight of the ammonium salt of a polyvalent acid, the proportions of said cationic and alkaline substances and said ammonium salt being based on the dry weight of the cloth.

U.S. Pat. No. 5,667,572 (Taniguchi et al.), the disclosure of which is totally incorporated herein by reference, discloses an ink composition which can provide a print having better waterfastness, stably contains a colorant substantially insoluble or sparingly soluble in water, is less likely to cause clogging of a recording head, and can be advantageously used for ink jet recording. The ink composition comprises a colorant which is either sparingly soluble or insoluble in water, a water-soluble organic solvent capable of dissolving the colorant, a saccharide and/or polyvinyl pyrrolidone, and water.

U.S. Pat. No. 5,223,338 (Malhotra), the disclosure of which is totally incorporated herein by reference, discloses a recording sheet comprising a substrate and a coating consisting essentially of an optional binder, an optional filler, and quaternary ammonium polymers selected from

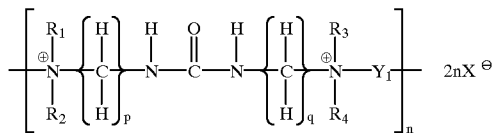

wherein n is an integer from 1 to 200, $R_1$, $R_2$, $R_3$, and $R_4$ are selected from alkyl, hydroxyalkyl, and polyoxyalkylene, p is an integer from 1 to 10, q is an integer from 1 to 10, X is an anion, and $Y_1$ is selected from $—CH_2CH_2OCH_2CH_2—$, $—CH_2CH_2OCH_2CH_2OCH_2CH_2—$, $—(CH_2)_k—$, wherein k is an integer from 2 to 10, and $—CH_2CH(OH)CH_2—$;

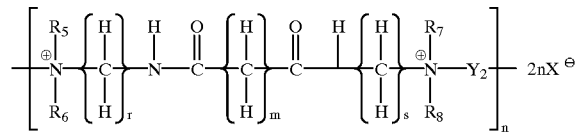

wherein n is an integer from 1 to 200, $R_5$, $R_6$, $R_7$, and $R_8$ are selected from alkyl, hydroxyalkyl, and polyoxyalkylene, m is an integer from 0 to 40, r is an integer from 1 to 10, s is an integer from 1 to 10, X is an anion, and $Y_2$ is selected from $—CH_2CH_2OCH_2CH_2—$, $—CH_2CH_2OCH_2CH_2OCH_2CH_2—$, $—(CH_2)_k—$, wherein k is an integer from 2 to 10, and $—CH_2CH(OH)CH_2—$;

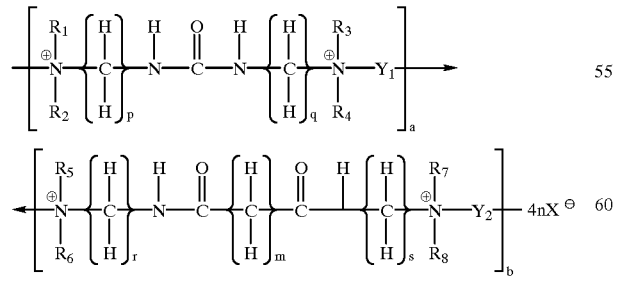

wherein a and b are integers wherein the sum of a+b is from 2 to 200, $R_1$, $R_2$, $R_3$, $R_4$, $R_5$, $R_6$, $R_7$, and $R_8$ are selected from alkyl, hydroxyalkyl, and polyoxyalkylene, p is an integer from 1 to 10, q is an integer from 1 to 10, X is an anion, and $Y_1$ and $Y_2$ are selected from $—CH_2CH_2OCH_2CH_2—$, $—CH_2CH_2OCH_2CH_2OCH_2CH_2—$, $—(CH_2)_k—$, wherein k is an integer from 2 to 10, and $—CH_2CH(OH)CH_2—$. Mixtures of these polymers are also suitable.

U.S. Pat. No. 5,618,338 (Kurabayashi et al.), the disclosure of which is totally incorporated herein by reference, discloses a liquid composition containing at least a cationic substance and finely ground cellulose. The invention further provides a liquid composition which contains a cationic substance having a molecular weight of 1000 or less and finely ground cellulose. The invention further provides an ink set which is obtained by combining the liquid composition with an ink, and an image-forming method and apparatus which employ the liquid composition and the ink.

U.S. Pat. No. 5,019,166 (Schwarz), the disclosure of which is totally incorporated herein by reference, discloses a thermal ink jet printing composition comprising a dye, a liquid medium, and a surfactant selected from the group consisting of polyoxyalkylated ethers, anionic bitail fluorothio alkyls, alkyl aryl sulfonates, alkyl amine quaternary salts, and mixtures thereof. Also disclosed is a process for generating images which comprises causing the ink compositions disclosed herein to be ejected from a thermal ink jet printer in imagewise fashion onto a substrate.

U.S. Pat. No. 5,156,675 (Breton et al.), the disclosure of which is totally incorporated herein by reference, discloses fast drying ink compositions containing a colorant, a dye, water and a cosolvent. Some of the ink compositions dry in less than about 1 second and have a viscosity of between about 1.6 and about 2.5 centipoise and a specified surface tension. Some of the ink compositions contain specified cosolvents, preferably a mixture of diethylene glycol monobutyl ether and glycerol.

U.S. Pat. No. 5,518,534 (Pearlstine et al.), the disclosure of which is totally incorporated herein by reference, discloses an ink set for alleviating bleed in multicolor printed elements employing a first ink and a second ink, each containing an aqueous carrier medium and a colorant; the colorant in the first ink being a pigment dispersion and the second ink containing a salt of an organic acid or mineral acid having a solubility of at least 10 parts in 100 parts of water at 25° C.

U.S. Pat. No. 5,509,957 (Toan et al.), the disclosure of which is totally incorporated herein by reference, discloses ink compositions, in particular for ink jet printing, containing as stabilizer a water soluble compound of formula

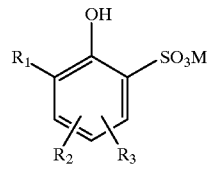

or

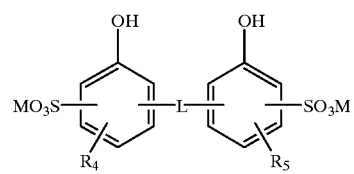

wherein $R_1$ is H, $C_1$–$C_{18}$ alkyl, $C_7$–$C_9$ phenylalkyl, phenyl, or a group of formula III

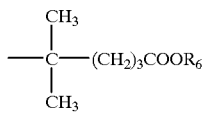

$R_2$ is H, $C_1$–$C_{18}$ alkyl, $C_7$–$C_9$ phenylalkyl, phenyl, a group of formula III, or group of formula —$CH_2CH_2COOR_6$, $R_3$ is H or $C_1$–$C_4$ alkyl, M is H, an alkali metal ion or a group $(R_7)(R_8)(R_9)(R_{10})N$ wherein $R_7$, $R_8$, $R_9$, and $R_{10}$ are each independently of one another H, unsubstituted $C_1$–$C_4$ alkyl, $C_1$–$C_4$ alkyl which is substituted by 1 to 3 —OH groups, $C_3$–$C_{20}$ alkyl which is interrupted by one or more than one oxygen atom, or are allyl, cyclopentyl, cyclohexyl, phenyl, benzyl or tolyl, L is a direct bond, —$C(R_{11})(R_{12})$—, or —S—, wherein $R_{11}$ and $R_{12}$ are each independently of the other H or $C_1$–$C_8$ alkyl, or $R_{11}$ and $R_{12}$, together with the linking carbon atom, form a cyclopentylene, cyclohexylene, or cycloheptylene ring, each unsubstituted or substituted by 1 to 3 $C_1$–$C_4$ alkyl groups, $R_4$ and $R_5$ are each independently of the other H or $C_1$–$C_8$ alkyl, $R_6$ is M, unsubstituted $C_1$–$C_4$ alkyl, or $C_1$–$C_4$ alkyl which is substituted by one —OH group, or is $C_3$–$C_{20}$ alkyl which is interrupted by one or more than one oxygen atom, and n is 0 or 1, said compounds, and recording materials containing them, and also discloses a process for stabilizing ink jet prints, the stabilizer being a compound of formula (I) or (II).

U.S. Pat. No. 5,116,410 (Miller), the disclosure of which is totally incorporated herein by reference, discloses a washable dye-containing composition comprising an acid dye, a dye vehicle, and an organic sulfonate in an amount of at least about 10 percent by weight of the composition. In one preferred embodiment, the composition is a washable marker ink, comprising an acid dye, water, and an aromatic sulfonate in an amount of at least about 10 percent by weight of the composition. In another embodiment, the composition is in the form of a water-soluble tempera paint comprising an acid dye, water, fillers, thickeners, opacifiers, and an organic sulfonate in an amount of at least about 10 percent by weight of the composition.

U.S. Pat. No. 4,231,841 (Calmanti et al.), the disclosure of which is totally incorporated herein by reference, discloses a de-inking composition consisting substantially of: (A) a salt of a fatty acid of the formula R—COO—M wherein R represents one or more hydrocarbon chains selected from the class consisting of saturated and/or unsaturated hydrocarbons and M represents a metal selected from the class consisting of Na and K, said taffy acid salt being present in an amount between 5 and 32 percent with respect to the weight of the entire composition; (B) a nonionic ethoxylated and/or propoxylated surfactant of the formula

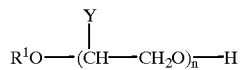

wherein Y is either H or $CH_3$; $R^1O$ represents the hydrophobic moiety of the molecule and is derived from a compound selected from the class consisting of alkylphenols of formula saturated primary fatty alcohols of formula R"—$CH_2OH$; saturated secondary fatty alcohols of formula R'''

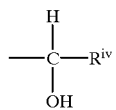

fatty acids of the formula $R^v$—COOH; and mixtures thereof, wherein R', R", R''', $R^{iv}$ and $R^v$ are alkyl chains; and n is a number between 2 and 40; said nonionic surfactant being present in an amount between 5 and 25 percent by weight of the entire composition; (C) an anionic surfactant selected from the class consisting of sulphonates of the formula $R^2$—$SO_3$—M'; sulphates of formula $R^3$—O—$SO_3$—M', and mixtures thereof, wherein $R^2$ is selected from the class consisting of linear paraffin chains, olefine chains, and alkylaryl chains, $R^3$ is a paraffin chain, and M' is selected from the class consisting of Na, K, $NH_4$, and mono-, di- and tri-substituted alkylamines; said anionic surfactant being present in an amount between 2 and 8 percent with respect to the weight of the entire composition; (D) a sodium-carboxylmethyl-cellulose in an amount between 1 and 5 percent with respect to the weight of the entire composition; and (E) an alkaline inorganic salt selected from the class consisting of metasilicate, disilicate, carbonate, borate and polyphosphates, said alkaline inorganic salt being present in an amount between 30 and 80 percent of the entire composition; the percentages of the components (A), (B), (C), (D) and (E) totaling essentially 100 percent. A process of de-inking is also disclosed.

U.S. Pat. No. 5,017,224 (Tomita et al.), the disclosure of which is totally incorporated herein by reference, discloses an aqueous ink composition having high water resistance and excellent age stability and resistance to drying-up. A feature resides in a water resistant ink composition comprising an aqueous vehicle which contains a polyamine containing primary amino groups in the proportion of 3–20 percent of amino groups contained in a molecule, one, two, or more stabilizing agent selected from urea, thiourea, ethylene urea, hydroxyethyl urea, hydroxypropyl urea, ethylene, thiourea, diethyl thiourea, 2-pyrrolidone, polyvinyl pyrrolidone, sorbitol, dimethylsulfone, and mixtures thereof, and water and an anionic dye having a solubility of 10 percent by weight or more in said aqueous vehicle.

Japanese Pat. No. Publication JP-08009701, the disclosure of which is totally incorporated herein by reference, discloses a recording liquid for ink jet printing which comprises a water soluble dye, an aqueous medium, and a pyridazinium polymer of the formula

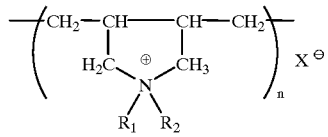

wherein $R_1$=H or (un)substituted alkyl group, $R_2$=(un)substituted alkyl group, X=anion, and n=100 to 5,000. The pyridazinium polymer is present in the ink in an amount of 0.5 to 20 weight percent. The ink preferably also contains a surfactant, has a pH of 6 to 8, and contains a compound of urea, thiourea, biuret, or semicarbazide.

U.S. Pat. No. 5,861,447 (Nagasawa et al.), the disclosure of which is totally incorporated herein by reference, discloses an aqueous pigment ink composition comprising an oxidized carbon black obtained by wet oxidation of a carbon black using a hypohalous acid and/or salt thereof, and a water soluble cationic polymer or oligomer in an aqueous medium. The ink does not cause nozzle clogging when used in an ink jet printer, enables smooth writing from a narrow pen tip, and provides images with excellent water resistance, light resistance, density, and hue.

U.S. Pat. No. 5,292,441 (Chen et al.), the disclosure of which is totally incorporated herein by reference, discloses the use of polyquaternized vinyl amines for water clarification.

U.S. Pat. No. 5,788,753 (Pawlowski et al.), the disclosure of which is totally incorporated herein by reference, discloses an ink for ink jet printers comprising an aqueous-based vehicle and an anionic dye complexed with a polyamine in an amount sufficient to form a pH-insensitive, water soluble dye/polyamine complex that acts like a cationic dye. Also disclosed is a method for converting the anionic dye to the cationic dye for formulating an ink jet of ink of desired pH. The method comprises adding a sufficient amount of the polyamine to form the dye/polyamine complex, which is a complex of the dye and the cationic polyamine polymer. The complex behaves as a cationic dye. The inks exhibit good waterfastness, pH-insensitivity, superior inter-ink bleed, and reduced crusting or drying in ink jet nozzles.

U.S. Pat. No. 5,626,655 (Pawlowski et al.), the disclosure of which is totally incorporated herein by reference, discloses an ink jet ink composition including at least one primary surfactant and at least one cosurfactant, with the cosurfactant having an HLB at least about 1.5 units higher than that of the primary surfactant. The cosurfactant imparts good wetting and cloud point characteristics to the ink without sacrificing the bleed control achieved with the use of the low HLB surfactant.

U.S. Pat. No. 5,206,071 (Atherton et al.), the disclosure of which is totally incorporated herein by reference, discloses film media useful in ink jet printing which comprise a transparent, translucent, or opaque substrate having on at least one side thereof a water insoluble, water absorptive, and ink receptive matrix, the matrix comprising a hydrogel complex and a polymeric high molecular weight quaternary ammonium salt.

U.S. Pat. No. 5,531,818 (Lin et al.), the disclosure of which is totally incorporated herein by reference, discloses a thermal ink jet printing process which comprises (a) incorporating into a thermal ink jet printer an ink composition comprising water, a dye, and pigment particles having an average particle diameter of from about 0.001 micron to about 10 microns, said pigment particles being present in the ink in an amount of less than 0.1 percent by weight; and (b) causing droplets of the ink to be ejected in an imagewise pattern onto a recording medium by selectively heating the ink in the printer in an imagewise pattern, thereby generating images on the recording medium. The disclosed ink is capable of producing large drop mass, high ink velocity, good directionality, and high quality images on plain papers with excellent long term jetting stability.

U.S. Pat. No. 5,271,765 (Ma), the disclosure of which is totally incorporated herein by reference, discloses ink jet ink compositions which comprise an aqueous carrier medium, a cationic dye, and a cationic polymer. The inks have excellent crusting behavior and kogation property and may be used with a variety of ink jet printers such as continuous, piezo-electric drop on demand, and thermal or bubble jet drop on demand, and are particular adapted for use in thermal ink jet printers.

U.S. Pat. No. 5,958,121 (Lin), the disclosure of which is totally incorporated herein by reference, discloses a set of inks for printing multicolor images in an ink jet printer, said ink set comprising (A) a first ink having a first color and comprising water and a colorant selected from the group consisting of (1) anionic dyes, (2) dyes having physically or chemically associated therewith a stabilizing agent having anionic groups thereon, (3) pigment particles having anionic groups chemically attached thereto, (4) pigment particles having physically or chemically associated therewith a stabilizing agent having anionic groups thereon, and (5) mixtures thereof; and (B) a second ink comprising water, an optional colorant having a color other than the first color, and an ammonium salt having at least two cationic ammonium functional groups, wherein the colorant in the first ink is capable of being immobilized on a printing substrate by interaction with the ammonium salt having at least two cationic ammonium functional groups in the second ink.

Copending application U.S. Ser. No. 09/047,097, filed Mar. 24, 1998, entitled "Ink Compositions With Improved Waterfastness and Smear Resistance," with the named inventors Kurt B. Gundlach, Richard L. Colt, Luis A. Sanchez, Maura A. Sweeney, and Edward J. Radigan, Jr., the disclosure of which is totally incorporated herein by reference, discloses an ink composition which comprises water, an anionic dye, and a polyquaternary amine compound selected from the group consisting of polydiallyl ammonium compounds, polyquaternized polyvinylamines, polyquaternized polyallylamines, and mixtures thereof. Also disclosed are methods for using the aforementioned ink composition in ink jet printing processes.

Copending application U.S. Ser. No. 09/046,852, filed Mar. 24, 1998, entitled "Ink Compositions With Improved Shelf Stability", with the named inventors Kurt B. Gundlach, Luis A. Sanchez, Richard L. Colt, Maura A. Sweeney, and William M. Schwarz, the disclosure of which is totally incorporated herein by reference, discloses an ink composition which comprises (1) water; (2) a nonpolymeric salt comprising at least one cation and at least one anion; and (3) a colorant comprising an anionic dye complexed with a polyquaternary amine compound. Also disclosed is an ink composition which comprises (1) water; (2) a nonpolymeric salt comprising at least one cation and at least one anion; (3) an anionic dye; and (4) a polyquaternary amine compound. In one embodiment, the polyquaternary amine compound is selected from the group consisting of polydiallyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

Copending application U.S. Ser. No. 09/046,849, filed Mar. 24, 1998, entitled "Ink Compositions Containing Cationic Amido Amine Polymers", with the named inventor William M. Schwarz, the disclosure of which is totally incorporated herein by reference, discloses an ink composition which comprises (1) water; (2) a dye; and (3) a cationic amido amine copolymer. Also disclosed are methods for using the aforementioned ink composition in ink jet printing processes.

Copending application U.S. Ser. No. 09/047,278, filed Mar. 24, 1998, entitled "Ink Compositions Containing Vinyl Pyrrolidinone/Vinyl Imidazolium Copolymers", with the named inventor William M. Schwarz, the disclosure of which is totally incorporated herein by reference, discloses an ink composition which comprises (1) water; (2) an anionic dye; and (3) a copolymer of vinyl pyrrolidinone and a vinyl imidazolium salt. Also disclosed are methods for using the aforementioned ink compositions in ink jet printing processes.

Copending application U.S. Ser. No. 09/106,621, filed Jun. 29, 1998, entitled "Ink Compositions Substantially Free of Organic Liquids", with the named inventors Kurt B. Gundlach, Maura A. Sweeney, Luis A. Sanchez, Richard L. Colt, and Melvin D. Croucher, the disclosure of which is totally incorporated herein by reference, discloses an ink composition which comprises water, an acid dye, a monovalent salt, a polyquaternary amine compound, and an optional nonionic or cationic surfactant, said ink being substantially free of organic solvents. The ink is particularly suitable for applications such as ink jet printing and marking pens. The disclosed inks in some embodiments are substantially indelible. Also disclosed is a composition for removing the ink compositions from substrates to which they have been applied which comprises water and a dianionic surfactant, optionally further containing a salt, urea, and/or a viscosity building agent such as a gum.

Copending application U.S. Ser. No. 09/405,680, filed Sep. 24, 1999, entitled "Improved Washing Composition for Indelible Marks", with the named inventors Kurt B. Gundlach and Richard L. Colt, the disclosure of which is totally incorporated herein by reference, discloses a washing composition which comprises a linear alkyl diphenyl oxide disulfonate compound, a chloride, bromide, iodide, nitrate, acetylacetonate, polyphosphate, squarate, or sulfonate salt or mixtures thereof, and a cosolvent which is propylene glycol, dipropylene glycol, tripropylene glycol, diethylene glycol, glycerine, trimethylolethane, trimethylolpropane, or mixtures thereof.

Copending application U.S. Ser. No., filed concurrently herewith, entitled "Ink Compositions Containing Malonaldehyde Bis(Dimethylacetal)," with the named inventors Kurt B. Gundlach and Richard L. Colt, the disclosure of which is totally incorporated herein by reference, discloses an ink composition comprising (a) water, (b) a colorant, and (c) malonaidehyde bis(dimethylacetal).

While known compositions and processes are suitable for their intended purposes, a need remains for improved ink compositions, particularly those suitable for use in ink jet printing. In addition, a need remains for ink compositions that exhibit rapid penetration into recording substrates such as plain paper. Further, a need remains for ink compositions that exhibit reduced intercolor bleed when printed next to images of another color. Additionally, a need remains for ink compositions with desirable viscosity values. There is also a need for ink compositions that enable long recoverability times in ink jet hardware.

SUMMARY OF THE INVENTION

The present invention is directed to an ink composition comprising (a) water, (b) a colorant, and (c) 1,3,5-trioxane or tetraethylene glycol dimethyl ether. Another embodiment of the present invention is directed to a printing process that comprises (1) incorporating into an ink jet printing apparatus an ink composition comprising (a) water, (b) a colorant, and (c) 1,3,5-trioxane or tetraethylene glycol dimethyl ether, and (2) causing droplets of the ink to be ejected in an imagewise pattern onto a recording sheet. Yet another embodiment of the present invention is directed to a process for reducing intercolor bleed in ink jet printing which comprises (1) incorporating into an ink jet printing apparatus a first ink composition of a first color comprising (a) water, (b) a colorant, and (c) 1,3,5-trioxane or tetraethylene glycol dimethyl ether, (2) incorporating into the ink jet printing apparatus a second ink composition of a color different from the first color and comprising (a) water, and (b) a pigment colorant, said second ink composition being substantially free of malonaldehyde bis(dimethylacetal), and (3) causing droplets of the first ink and the second to be ejected in an imagewise pattern onto a recording sheet, wherein at least some droplets of the first ink are ejected onto the recording sheet adjacent to at least some droplets of the second ink, and wherein intercolor bleed between the first ink and the second ink is reduced.

DETAILED DESCRIPTION OF THE INVENTION

The inks of the present invention contain an aqueous liquid vehicle. The liquid vehicle can consist solely of water, or it can comprise a mixture of water and a water soluble or water miscible organic component, such as ethylene glycol, propylene glycol, diethylene glycol, glycerine, dipropylene glycol, polyethylene glycol, polypropylene glycol, amides, ethers, urea, substituted ureas, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, sulfoxides, lactones, polyelectrolytes, methyl sulfonylethanol, imidazole, betaine, and other water soluble or water miscible materials, as well as mixtures thereof. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

Preferably, the ink contains water in a minimal amount. More specifically, it is preferred that the ink contain water in an amount of no more than about 80 percent by weight of the ink, more preferably in an amount of no more than about 60 percent by weight of the ink, and even more preferably in an amount of no more than about 50 percent by weight of the ink, although the amount can be outside of these ranges.

In another preferred embodiment, the ink composition of the present invention also contains tripropylene glycol monomethyl ether. This material is commercially available from, for example, Dow Chemical Co., Midland Mich., as DOWANOL TPM. While not being limited to any particular theory, it is believed that the combination of 1,3,5-trioxane and tripropylene glycol monomethyl ether enable exceptionally rapid penetration of the ink into recording substrates such as plain paper. When present, the tripropylene glycol monomethyl ether is present in the ink typically in an amount of from about 2 to about 25 percent by weight of the ink, preferably from about 7 to about 20 percent by weight of the ink, and more preferably from about 9 to about 15 percent by weight of the ink, although the amount can be outside of these ranges.

In a particularly preferred embodiment, the inks of the present invention further contain at least one of the following additional ingredients, preferably although not necessarily in the indicated amount ranges:

sulfolane: typically from 0 to about 50 percent by weight of the ink, preferably from about 5 to about 40 percent by weight of the ink, and more preferably from about 10 to about 30 percent by weight of the ink, although the amount can be outside of these ranges;

formamide: typically from 0 to about 40 percent by weight of the ink, preferably from about 5 to about 25 percent by weight of the ink, and more preferably from about 8 to about 20 percent by weight of the ink, although the amount can be outside of these ranges.

The inks of the present invention also contain a colorant. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15,25,71, 76, 78, 80, 86,90, 106, 108, 123, 163, 165, 199, 226, and the like), Direct Red dyes (No. 1, 2,16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Clariant Corp., Charlotte, N.C., such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Sevron Blue 5GMF (ICI); various Reactive dyes, including Reactive Black dyes, Reactive Blue dyes, Reactive Red dyes, Reactive Yellow dyes, and the like, as well as mixtures thereof. The dye is present in the ink composition in any desired or effective amount, typically from about 0.05 to about 15 percent by weight of the ink, preferably from about 0.1 to about 10 percent by weight of the ink, and more preferably from about 1 to about 5 percent by weight of the ink, although the amount can be outside of these ranges.

Examples of suitable pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine®

Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (Clariant Corp., Charlotte, N.C.), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow F6 1 (Clariant Corp., Charlotte, N.C.), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, N.C.), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company)), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Clariant Corp., Charlotte, N.C., including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration. Typically, the pigment is present in an amount of from about 0.1 to about 8 percent by weight of the ink, and preferably from about 2 to about 7 percent by weight of the ink, although the amount can be outside these ranges.

In one preferred embodiment of the present invention, the colorant comprises a mixture of an anionic dye and a polyquaternary amine compound, and the ink further contains a monomeric salt comprising at least one cation and at least one anion. Any desired or suitable anionic dye can be employed, including (but not limited to) those listed hereinabove. In this embodiment, the anionic dye is present in the ink composition in any desired or effective amount, typically from about 0.05 to about 10 percent by weight of the ink, preferably from about 0.1 to about 7 percent by weight of the ink, and more preferably from about 1 to about 5 percent by weight of the ink, although the amount can be outside of these ranges. The polyquaternary amine compound, which generally is believed to be complexed with the anionic dye, is a polymer containing quaternary groups in the repeat units thereof. The polymer typically has a weight average molecular weight of from about 1,000 to about 10,000,000, preferably from about 3,000 to about 1,000,000, and more preferably from about 5,000 to about 400,000, although the value can be outside of these ranges. The polymer typically has a number average molecular weight of from about 800 to about 11,000,000, preferably from about 3,300 to about 1,100,000, and more preferably from about 5,600 to about 450,000, although the value can be outside of these ranges. The polymer typically has from about 5 to about 70,000 repeat monomer units therein, preferably from about 21 to about 7,000 repeat monomer units, and more preferably from about 35 to about 2,800 repeat monomer units, although the number of repeat monomer units can be outside of this range. Suitable polyquaternary amine compounds typically are of the general formulae

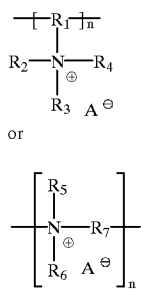

or wherein n is an integer representing the number of repeat monomer units, $R_1$ is an alkylene group, including saturated, unsaturated, cyclic, and substituted alkylene groups (including polymethylene oxide groups, polyethylene oxide groups, polypropylene oxide groups, and the like), typically with from 1 to about 30 carbon atoms and preferably with from 1 to about 6 carbon atoms, an arylene group, including substituted arylene groups, typically with from 6 to about 50 carbon atoms and preferably with from 6 to about 18 carbon atoms, or an arylalkylene group, including substituted arylalkylene groups, typically with from 7 to about 60 carbon atoms and preferably with from 7 to about 20 carbon atoms, and $R_2$, $R_3$, $R_4$, $R_5$, $R_6$, and $R_7$ each, independently of the others, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from 6 to about 18 carbon atoms, arylalkyl groups, including substituted arylalkyl groups, typically with from 7 to about 60 carbon atoms and preferably with from 7 to about 20 carbon atoms, wherein the substituents on the substituted alkyl, alkylene, aryl, arylene, arylalkyl, and arylalkylene groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring.

Examples of suitable polyquaternary amine compounds include polydiallyl ammonium compounds, of the general formula

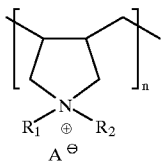

wherein n is an integer representing the number of repeat monomer units, $R_1$ and $R_2$ each, independently of the other, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, or arylalkyl groups, including substituted arylalkyl groups, typically with from about 7 to about 60 carbon atoms and preferably with from 7 to about 20 carbon atoms, wherein the substituents on the substituted alkyl aryl, and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, and A is an anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like, such as polydiallyl dimethyl ammonium compounds, including polydiallyl dimethyl ammonium chloride, of the formula

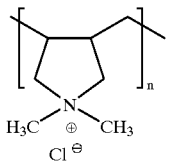

wherein n is an integer representing the number of repeat monomer units, commercially available with a molecular weight of about 400,000 (wherein n is an integer of about 2,500) from Calgon Corp. as 261-RV, and with a molecular weight of about 5,000 (wherein n is an integer of about 31) from Calgon Corp. as VARIKEM 110 or E2253.

Also suitable are polyquaternized polyvinylamines, of the general formula

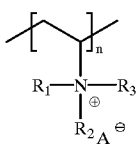

wherein n is an integer representing the number of repeat monomer units, $R_1$, $R_2$, and $R_3$ each, independently of the others, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, arylalkyl groups, including substituted arylalkyl groups, typically with from 7 to about 60 carbon atoms and preferably with from 7 to about 20 carbon atoms, wherein the substituents on the substituted alkyl, aryl and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, and A is an anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like.

Also suitable are polyquaternized polyallylamines, of the general formula

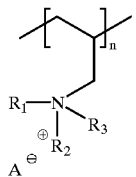

wherein n is an integer representing the number of repeat monomer units, $R_1$, $R_2$, and $R_3$ each, independently of the others, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, arylalkyl groups, including substituted arylalkyl groups, typically with from 7 to about 60 carbon atoms and preferably with from 7 to about 20 carbon atoms, wherein the substituents on the substituted alkyl, aryl and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a rng, and A is an anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like.

Also suitable are epichlorohydrin/amine copolymers, including those of the general formula

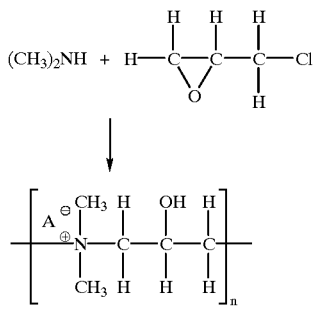

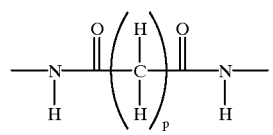

wherein n is an integer of from about 3 to about 3,000, and preferably from about 5 to about 100, although the value can be outside of these ranges, and A is any suitable or desired anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like. Polymers of this formula are commercially available from Hercules, Wilmington, DE as RETEN 200 or RETEN 201 (molecular weight generally less than 10,000), and from Cytex, Inc., West Patterson, N.J., as CYPRO 514, 515, and 516 (wherein the polymers have a molecular weight range of from about 75,000 to about 250,000 and n is from about 870 to about 3,000), and as SUPERFLOC C567 (wherein the polymer has a molecular weight of about 10,000 and n is from about 110 to about 120, typically about 116).

Also suitable are cationic amido amine copolymers. Examples of suitable cationic amido amine copolymers include those of the general formula

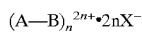

wherein X is an anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like, n is an integer representing the number of repeating monomer units, and typically is from about 2 to about 1,000, preferably from about 3 to about 200, more preferably from about 3 to about 100, and even more preferably from about 3 to about 10, although the value can be outside of these ranges, "A" is

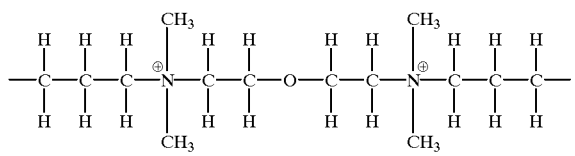

and "B" is selected from the group consisting of (a) monomers of the formula

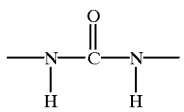

wherein p is an integer representing the number of repeat monomer units, and typically is from 1 to about 12, preferably from 1 to about 7, and more preferably from 1 to about 4, although the value can be outside of these ranges, such as (i) azelaic acid diamido, wherein p is 7, of the formula

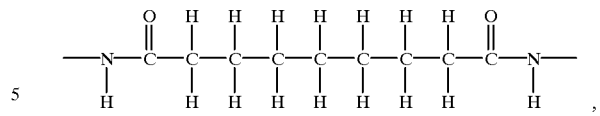

or (ii) adipic acid diamido, wherein p is 4, of the formula

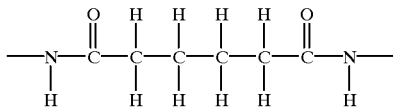

and (b) ureido, of the formula

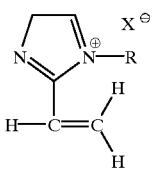

Mixtures of two or more "B" monomers can also be used within the polymer. In a preferred embodiment, these specific polymers typically are condensation polymers, with alternating "A" and "B" monomer units. The weight average molecular weight of the polymer typically is from about 1,000 to about 100,000, preferably from about 1,000 to about 30,000, and more preferably from about 2,000 to about 5,000, although the value can be outside of these ranges. Copolymers of an amine and an amide are commercially available from, for example, Rhone-Poulenc, Cranbury, N.J., as, for example, MIRAPOL AZ-1, of the above formula wherein the "B" monomer is azelaic acid diamido, n has an average value of about 100, and the molecular weight is about 50,000, MIRAPOL AD-1, of the above formula wherein the "B" monomer is adipic acid diamido, n has an average value of about 100, and the molecular weight is about 50,000, and MIRAPOL A-15, of the above formula wherein the "B" monomer is ureido, n has an average value of about 6, and the molecular weight is about 2,260.

Also suitable are copolymers of vinyl pyrrolidinone and a vinyl imidazolium salt. In one embodiment, the copolymer is of a vinyl imidazolium salt of the formula wherein X is an anion and R is a hydrogen atom or an alkyl group, typically with from 1 to about 8 carbon atoms and preferably with from 1 to about 3 carbon atoms, and vinyl pyrrolidinone, of the formula

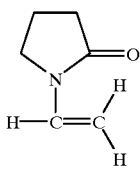

wherein the copolymer is of the general formula

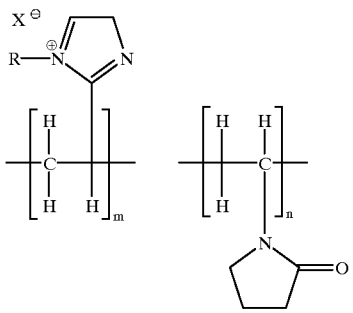

wherein X is any suitable or desired anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like, R is a hydrogen atom or an alkyl group, typically with from 1 to about 8 carbon atoms, and preferably with from 1 to about 3 carbon atoms, m is a integer representing the number of repeat vinyl imidazolium units, and n is an integer representing the number of repeat vinyl pyrrolidinone units. When R is a hydrogen atom, the pH of the ink can be adjusted to provide optimal ink-paper interaction; for example, the hydrogen atom can be extracted upon contact with the paper, or the cationic character of the polymer can be adjusted with ink pH. Random copolymers of the above formula generally are preferred, although alternating and block copolymers are also suitable. The weight average molecular weight of the polymer typically is from about 1,000 to about 1,000,000, preferably from about 1,000 to about 100,000, and more preferably from about 2,000 to about 5,000, although the value can be outside of these ranges. The ratio of vinyl imidazolium monomers to vinyl pyrrolidinone monomers typically is from about 99:1 to about 5:95, preferably from about 95:5 to about 20:80, more preferably from about 95:5 to about 30:70, and even more preferably from about 95:5 to about 50:50, although the value can be outside of these ranges. Vinyl pyrrolidinone/vinyl imidazolium salt copolymers are commercially available; for example, BASF, Parsippany, N.J., provides vinyl imidazolium chloride/vinyl pyrrolidinone copolymers (of the above formula wherein R is $CH_3$) with a molecular weight of about 100,000 in three monomer ratios: LUVIQUAT® FC905 has a vinyl imidazolium chloride:vinyl pyrrolidinone ratio of 95:5 with 6.7 milliequivalents per gram of cationic groups, LUVIQUAT® FC550 has a vinyl imidazolium chloride:vinyl pyrrolidinone ratio of 50:50 with 3.0 milliequivalents per gram of cationic groups, and LUVIQUAT® FC370 has a vinyl imidazolium chloride:vinyl pyrrolidinone ratio of 30:70 with 1.8 milliequivalents per gram of cationic groups. Also available from BASF is LUVIQUAT® HM552, with a molecular weight of about 800,000 and a vinyl imidazolium chloride:vinyl pyrrolidinone ratio of 50:50.

Mixtures of two or more polyquaternary amine compounds can also be present in the ink.

The polyquaternary amine compound is present in the ink in any desired or effective amount, typically from about 0.01 to about 50 percent by weight of the ink, more typically from about 0.05 to about 40 percent by weight of the ink, preferably from about 0 to about 10 percent by weight of the ink, more preferably from about 1 to about 9 percent by weight of the ink, and even more preferably from about 1 to about 5 percent by weight of the ink, although the amount can be outside of these ranges. The preferred relative amounts of polyquaternary amine and anionic dye in the ink can also be expressed as a stoichiometric ratio, with the molar ratio of anionic dye groups to cationic polyquaternary groups typically being from about 1:0.33 to about 1:300, preferably from about 1:1 to about 1:20, more preferably from about 1:2 to about 1:6, and most preferably about 1:3, although the relative amounts can be outside of these ranges.

While not being limited to any particular theory, it is believed that the polyquaternary amine and the dye form a multidentate ionic complex upon admixing of the ink ingredients. While the ink ingredients can be mixed in any desired order, it is preferred that any salts present in the ink be added prior to addition of the dye or the polyquaternary amine. The structure of the polyquaternary complex generally is independent of ink pH over the normal pH range of the ink.

In embodiments of the present invention wherein the colorant is a mixture of an anionic dye and a polyquaternary amine, the inks further contain a nonpolymeric salt comprising at least one cation and at least one anion. Examples of suitable cations include alkali metal cations, such as $Li^+$, $Na^+$, and $K^+$, alkaline earth metal cations, such as $Mg^{2+}$ and $Ca^{2+}$, nonpolymeric or monomeric ammonium and quaternary amine cations, including those of the general formula

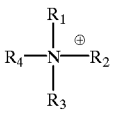

wherein each of $R_1$, $R_2$, $R_3$, and $R_4$, independently of the others, is a hydrogen atom, an alkyl group (including saturated, unsaturated, cyclic, and substituted alkyl groups, wherein substituted alkyl groups can include alkoxy or polyalkoxy groups such as ethylene oxide, polyethylene oxide, or the like), preferably with from 1 to about 10 carbon atoms and more preferably with from 1 to about 4 carbon atoms, although the number of carbon atoms can be outside of this range, aryl groups, including substituted aryl groups, preferably with from 6 to about 18 carbon atoms and more preferably with from 6 to about 12 carbon atoms, although the number of carbon atoms can be outside of this range, or arylalkyl groups, preferably with from 7 to about 20 carbon atoms and more preferably with from 7 to about 13 carbon atoms, wherein the substituents on the substituted alkyl, aryl, and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, with specific examples of ammonium and quaternary amine cations including $NH_4^+$, $N(CH_3)_4^+$, $H_3NCH_2CH_2NH_3^{2+}$, $(H_3C)_3NCH_2CH_2N(CH_3)_3^{2+}$, imidazolium, quatemized 1,4-diazabicyclo(2.2.2)octane, choline, of the formula

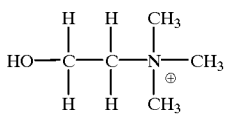

alkyl amine quaternary salts such as ETHOQUAD C/12, of the formula

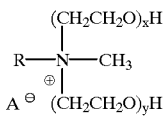

wherein R is a long chain alkyl group with 12 carbon atoms, x and y are integers of 0, 1, or 2 representing the number of ethoxy groups, wherein x+y=2, and A is an anion, such as chloride, commercially available from Akzo Chemie, Chicago, Ill, and the like, as well as mixtures thereof. Any desired anion can be employed. Examples of suitable anions include sulfate, sulfonate, sulfamate ($NH_2SO_3^-$), carbonate, nitrate, perchlorate, organic acid anions, such as formate, acetate, propionate, and the like, acetylacetonate, of the formula

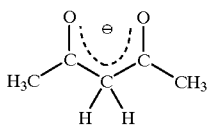

squarate, of the formula

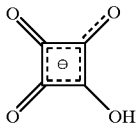

halides, including chloride, bromide, and iodide, and the like, as well as mixtures thereof. Specific examples of suitable salts include lithium chloride, lithium bromide, lithium iodide, lithium nitrate, lithium formate, lithium acetate, lithium propionate, lithium sulfate, lithium sulfonate, lithium sulfamate, lithium carbonate, lithium perchlorate, lithium acetylacetonate, lithium squarate, sodium chloride, sodium bromide, sodium iodide, sodium nitrate, sodium perchlorate, sodium formate, sodium acetate, sodium propionate, sodium sulfate, sodium sulfonate, sodium sulfamate, sodium carbonate, sodium perchlorate, sodium acetylacetonate, sodium squarate, potassium chloride, potassium bromide, potassium iodide, potassium formate, potassium acetate, potassium propionate, potassium sulfate, potassium sulfonate, potassium sulfamate, potassium carbonate, potassium perchlorate, potassium acetylacetonate, potassium squarate, calcium chloride, calcium nitrate, calcium formate, calcium acetate, calcium propionate, calcium sulfate, calcium sulfonate, calcium sulfamate, calcium carbonate, calcium perchlorate, calcium acetylacetonate, calcium squarate, magnesium chloride, magnesium sulfate, magnesium formate, magnesium acetate, magnesium propionate, magnesium sulfate, magnesium sulfonate, magnesium sulfamate, magnesium carbonate, magnesium perchiorate, magnesium acetylacetonate, magnesium squarate, ammonium chloride, ammonium bromide, ammonium iodide, ammonium acetate, ammonium formate, ammonium nitrate, ammonium sulfate, ammonium propionate, ammonium sulfonate, ammonium sulfamate, ammonium carbonate, ammonium perchlorate, ammonium acetylacetonate, ammonium squarate, tetramethylommonium chloride, tetramethylammonium formate, tetramethylammonium acetate, tetramethylammonium propionate, tetramethylammonium sulfate, tetramethylammonium sulfonate, tetramethylammonium sulfamate, tetramethylammonium carbonate, tetramethylammonium perchlorate, tetramethylammonium acetylacetonate, tetramethylommonium squarate, ethylene diamine dihydrochloride, 1,4-diazabicyclo(2.2.2)octane salts, such as hexamethonium bromide, of the formula

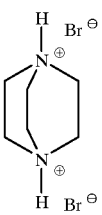

imidazole salts, such as imidazolium chloride, acetylacetonate salts, such as lithium acetylacetonate, squarate salts, such as tetramethylammonium squarate, choline salts, such as choline chloride, ETHOQUAD C/12, and the like. The salt can also be a complex salt, including transition metal complexes such as Zn(NH3)4 or the like. The salt is present in the ink in any desired or effective amount, typically from about 0.1 to about 40 percent by weight of the ink, preferably from about 0.1 to about 30 percent by weight of the ink, more preferably from about 0.5 to about 20 percent by weight of the ink, and even more preferably from about 2 to about 15 percent by weight of the ink, although the amount can be outside of these ranges. The preferred relative amounts of salt and anionic dye in the ink can also be expressed as a stoichiometric ratio, with the molar ratio of anions in the added salt to anionic dye groups typically being from about 0:1 to about 100:1 for anionic dyes and from about 0:1 to about 500:1 for direct dyes. For all anionic dyes (acid dyes, direct dyes, reactive dyes, and the like), the preferred molar ratio of anions in the added salt to anionic dye groups from about 5:1 to about 100:1, more preferably from about 10:1 to about 80:1. The molar ratio of anions in the added salt to anionic dye groups can, however, be outside of these ranges. In addition, when the anions in the added salt are multivalent, a lesser amount can be employed if desired; for example, if the anions in the added salt are bivalent, the amount added can be reduced to approximately one half of the amount desired for a monovalent anion.

While not being limited to any particular theory, it is believed that the presence of the salt improves the solubility or stability in the ink vehicle of the dye/polyquaternary amine compound complex which is employed as a colorant in the inks of the present invention. More specifically, it is believed that the salt electrostatically shields charges within the polyelectrolye complex constituting the colorant, thereby enabling a more compact structure which in turn is more soluble or stable in the ink vehicle. Again, while not being limited to any particular theory, it is believed that within the ink, the polyquaternary amine is associated with the anionic dye, with the dye playing the role of a counterion. The adjacent charge centers in the polyquaternary amine repel each other and force the polyquaternary amine into a more stretched-out and less soluble backbone configuration. The presence of the salt in the ink is believed to reduce these repulsions, compact the electrical double layer, and promote a more compact, more soluble polyquaternary amine complex. The presence of the salt in the ink can also reduce jitter when the ink is jetted and increase ink surface tension.

In another preferred embodiment, the polyquaternary amine compound is present in the ink in an amount such that the number of quaternary amine groups on the polyquaternary amine compound exceeds the number of anionic groups on the dye. In some instances, particularly when the ink vehicle contains cosolvents such as sulfolane and/or urea and a salt, when the dye and polyquaternary amine compound are present in relative amounts such that the number of anionic groups on the dye exceeds the number of cationic quaternary amine groups on the polymer, precipitation of the dye/polyquaternary amine complex from the ink vehicle can occur. Increasing the amount of polyquaternary amine compound in the ink in these instances enables an ink with excellent shelf stability, excellent waterfastness, excellent smear resistance, and reduced intercolor bleed.

Ink compositions containing increased amounts of polyquaternary amine compound and salt, i.e., at least about 6 percent by weight polyquaternary amine compound and at least about 12 percent by weight salt, also enable advantages such as the ability to formulate inks in the absence of stabilizing cosolvents such as sulfolane and urea. The ability to formulate inks without cosolvents or humectants such as these enables advantages such as increased compatibility of the ink with materials from which printheads are commonly made, improved shelf stability, and the like. Inks containing glycol cosolvents such as dipropylene glycol, tripropylene glycol monomethyl ether, and the like can be formulated without resulting colorant destabilization.

Inks containing a colorant comprising a mixture of an anionic dye and a polyquaternary amine and further containing a monomeric salt are disclosed in, for example, Copending Application U.S. Ser. No. 09/047,097, filed Mar. 24, 1998, entitled "Ink Compositions With Improved Waterfastness and Smear Resistance," with the named inventors Edward J. Radigan, Jr., Kurt B. Gundlach, Richard L. Colt, Luis A. Sanchez, Maura A. Sweeney, and Edward J. Radigan, Copending Application U.S. Ser. No. 09/046,852, filed Mar. 24, 1998, entitled "Ink Compositions With Improved Shelf Stability," with the named inventors Kurt B. Gundlach, Richard L. Colt, Luis A. Sanchez, Maura A. Sweeney, and William M. Schwarz, and Copending Application U.S. Ser. No. 09/106,621, filed Jun. 29, 1998, entitled "Ink Compositions Substantially Free of Organic Liquids," with the named inventors Kurt B. Gundlach, Maura A. Sweeney, Luis A. Sanchez, Richard L. Colt, and Melvin D. Croucher, the disclosures of each of which are totally incorporated herein by reference.

The inks of the present invention further contain 1,3,5-trioxane or tetraethylene glycol dimethyl ether. Trioxane is a polar aprotic compound of the formula

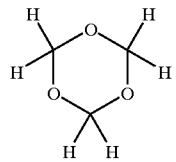

Tetraethylene glycol dimethyl ether is a polar aprotic compound of the formula

These materials are commercially available from, for example, Aldrich Chemical Co., Milwaukee, Wis. The 1,3,5-trioxane or tetraethylene glycol dimethyl ether (or mixture thereof) is present in the ink in any desired or effective amount, typically at least about 5 percent by weight of the ink, preferably at least about 10 percent by weight of the ink, and more preferably at least about 15 percent by weight of the ink, and typically no more than about 40 percent by weight of the ink, preferably no more than about 30 percent by weight of the ink, and more preferably no more than about 25 percent by weight of the ink, although the amount can be outside of these ranges.

While not being limited to any particular theory, it is believed that the 1,3,5-trioxane or tetraethylene glycol dimethyl ether, in addition to enabling superior ink penetration and reduced intercolor bleed, also enables these advantages without unduly raising the ink viscosity to an undesirable level. The high ratio of electron lone pairs to molecular weight of these materials is also believed to increase their hydrogen bonding capability to water. Again, while not being limited to any particular theory, it is believed that when the ink containing the 1,3,5-trioxane or tetraethylene glycol dimethyl ether contacts another ink containing a pigment colorant (either self-dispersing, i.e., pigment particles surface treated to render them more easily dispersed in an ink, or with pigment particles and a dispersant), the presence of the 1,3,5-trioxane or tetraethylene glycol dimethyl ether in the first ink causes removal of water hydrogen bonds from the pigment particles in the second ink to the troxane in the first ink, thereby destabilizing the pigment in the second ink, causing it to precipitate onto the paper and reducing its ability to migrate on paper. Intercolor bleed is accordingly reduced.

The 1,3,5-trioxane or tetraethylene glycol dimethyl ether can also be included in an ink containing a pigment colorant (either self-dispersing, i.e., pigment particles surface treated to render them more easily dispersed in an ink, or with pigment particles and a dispersant). The presence of the 1,3,5-trioxane or tetraethylene glycol dimethyl ether in the ink, generally in relatively lesser amounts than would be used in a dye-based ink, tends to destabilize the pigment colorant. The amount of 1,3,5-trioxane or tetraethylene glycol dimethyl ether is selected so that the pigment, while destabilized, is still sufficiently stably dispersed to enable functioning of the ink. When the ink contacts the paper, the pigment is immediately further destabilized, causing it to precipitate onto the paper and reducing its ability to migrate on paper. Intercolor bleed is accordingly reduced.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or bases, phosphate salts, carboxylates salts, sulfite salts, amine salts, and the like, present in an amount of from 0 to about 1 percent by weight of the ink and preferably from about 0.01 to about 1 percent by weight of the ink, or the like.

One example of an additive to the inks is a polymeric additive consisting of two polyalkylene oxide chains bound to a central bisphenol-A-type moiety. This additive is of the formula

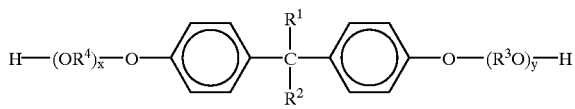

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, J. Molecular Science—Rev. Macromol. Chem. Phys., C25(3), 325–373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in thermal ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range, particularly for applications such as acoustic ink jet printing.

Ink compositions of the present invention can be of any suitable or desired pH. For some embodiments, such as thermal ink jet printing processes, typical pH values are from about 3 to about 11, preferably from about 5 to about 10, and more preferably from about 6 to about 8.5, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating an ink of the present invention into an ink jet printing apparatus and causing droplets of the ink to be ejected in an imagewise pattern onto a recording sheet. In one preferred embodiment, the printing apparatus employs a thermal ink jet process wherein the ink in the nozzles is selectively heated in an imagewise pattern, thereby causing droplets of the ink to be ejected in imagewise pattern. In another preferred embodiment, the printing apparatus employs an acoustic ink jet process, wherein droplets of the ink are caused to be ejected in imagewise pattern by acoustic beams.

Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared by simple mixing of the following ingredients:

| Ingredient | Supplier | Amount (grams) |
| --- | --- | --- |
| deionized water | — | 6.2 |
| imidazole | BASF | 0.5 |
| ethylene diamine tetraacetic acid | Dow Chemical Co. | 0.1 |
| PROJET YELLOW OAM dye* | Zeneca Colors | 50 |
| PROXEL GXL biocide | Zeneca Colors | 1 |
| sulfolane** | Phillips Petroleum Co. | 40 |
| 2-pyrrolidinone | BASF | 20 |
| DOWANOL TPM | Dow Chemical Co. | 10 |
| 1,3,5-trioxane | Aldrich Chemical Co. | 40 |
| PROJET YELLOW OAM dye*** | Zeneca Colors | 2.2 |
| ammonium bromide | Morre-Tec Industries | 10 |
| VARIKEM 110**** | Calgon | 20 |
| roll mill 30 minutes | | |

*containing 7.5 wt. % Acid Yellow 23 dye in water
**95 wt. % sulfolane, 5 wt. % water
***100 wt. % dye solids; oven stripped
****aqueous solution containing 40 wt. % polymer in water The resulting ink was filtered through a 1.2 micron filter. The ink exhibited a viscosity of 4.17 centipoise at 25° C., a pH of 7.54 at 25° C., a surface tension of 42.6 dynes per centimeter, and a conductivity of 21.3 millimhos.

The ink composition thus prepared was incorporated into a LEXMARK® 7200 thermal ink jet printer. Also incorporated into the printer was a black ink prepared by simple mixing of the following ingredients:

| Ingredient | Supplier | Amount (grams) |
|---|---|---|
| CABOJET ® carbon black dispersion (15.4 wt. % solids) | Cabot Corp. | 6.668 |
| deionized water | — | 10.4 |
| benzyl methacrylate/ polyethylene glycol methacrylate/methacrylic acid latex* | — | 0.284 |
| deionized water | — | 4 |
| sulfolane** | Phillips Petroleum Co. | 6.32 |
| 2-pyrrolidinone*** | BASF | 3.08 |
| GLIDE 404**** | Goldschmidt Chemical Corp. | 1.16 |
| deionized water | — | 4 |
| polyethylene oxide***** | Polysciences | 0.02 |
| deionized water | — | 1.06 |
| roll mill 30 minutes | | |

*acrylic resin emulsion comprising resins was derived from 23.6 percent by weight of methacrylic acid, 55.4 percent by weight of benzyl methacrylate, 21 percent by weight of polyethyleneglycol methacrylate ($M_w$ = 246), 3 percent by weight of dodecanethiol, and 1 percent by weight of carbon tetrabromide. A one liter kettle equipped with a mechanical stirrer was charged with 240 grams of water, 1.8 grams of sodium dodecylbenzene sulfonate (obtained from Rhone-Poulenc as Rhodacal Ds-10), and 2 grams of Triton X-100 (alkylphenoxypolyethanol, obtained from Aldrich Chemical Co.), and the mixture was stirred for 2 hours at about 100 rpm. To this solution were then added 1.8 grams of ammonium persulfate, followed by the addition of a mixture containing 28.3 grams of methacrylic acid, 66.5 grams of benzyl methacrylate, 25.2 grams of polyethyleneglycol methacrylate ($M_w$ = 246), 3.6 grams of dodecanethiol, and 1.2 grams of carbon tetrabromide. The mixture was heated to 80° C. for 6 hours. Thereafter, the resin emulsion was cooled to room temperature, and a sample (about 10 grams) was freeze dried and analyzed by GPC. The resin had a number average molecular weight of about 20,580 and a weight average molecular weight of about 8,193, with a polydispersity of 2.5.
**95 wt. % sulfolane, 5 wt. % water
***95 wt. % 2-pyrrolidinone, 5 wt. % water
****aqueous solution containing 35 wt. % polyethyleneoxide/ polypropylene oxide siloxane polymer in water
*****bisphenol-A derivative, molecular weight 18,500, of the formula

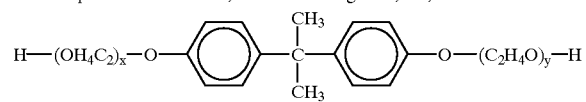

The ink exhibited a viscosity of 1.9 centipoise at 25° C., a pH of 7.27 at 25° C., a surface tension of 36.1 dynes per centimeter, and a conductivity of 0.298 millimhos.

The black and yellow inks were used to generate adjacent black and yellow images on Courtland® 4224 DP paper. Intercolor bleed was measured as the average MFLEN (Mid Frequency Line Edge Noise, Horizontal lines) of the interface between the two inks. Intercolor bleed usually is caused by undesirable mixing of inks near the bordering areas and results in a distorted line image with irregular edges and large MFLEN values. The smaller MFLEN number is desirable because it shows sharper line image with reduced intercolor bleed. The MFLEN number was obtained by equipment consisting of a personal computer, an illuminating light source, a filter, and an imaging microscope with a CDD sensor. The equipment was calibrated with a standard image (line with sharp edges). Software using a Fourier Transform technique was used to calculate the MFLEN data and line width. The average MFLEN was 4.9.

EXAMPLE II

An ink composition was prepared by simple mixing of the following ingredients:

| Ingredient | Supplier | Amount (grams) |
|---|---|---|
| deionized water | — | 5.8 |
| imidazole | BASF | 0.5 |
| ethylene diamine tetraacetic acid | Dow Chemical Co. | 0.5 |
| PROJET YELLOW OAM dye* | Zeneca Colors | 50 |
| PROXEL GXL biocide | Zeneca Colors | 1 |
| sulfolane** | Phillips Petroleum Co. | 50 |
| 2-pyrrolidinone | BASF | 30 |
| DOWANOL TPM | Dow Chemical Co. | 10 |
| 1,3,5-trioxane | Aldrich Chemical Co. | 50 |
| PROJET YELLOW OAM dye*** | Zeneca Colors | 2.2 |
| roll mill 30 minutes | | |

*containing 7.5 wt. % Acid Yellow 23 dye in water
**95 wt. % sulfolane, 5 wt. % water
***100 wt. % dye solids; oven stripped The resulting ink was filtered through a 1.2 micron filter. The ink exhibited a viscosity of 3.32 centipoise at 25° C., a pH of 7.31 at 25° C., a surface tension of 43.6 dynes per centimeter, and a conductivity of 2.6 millimhos.

The ink composition thus prepared was incorporated into a LEXMARK® 7200 thermal ink jet printer. Also incorporated into the printer was a black ink prepared as described in Example I. The black and yellow inks were used to generate adjacent black and yellow images on Courtland® 4224 DP paper. Intercolor bleed was measured as the average MFLEN (Mid Frequency Line Edge Noise, Horizontal lines) of the interface between the two inks. The average MFLEN was 10.3.

EXAMPLE III

An ink composition was prepared by simple mixing of the following ingredients:

| Ingredient | Supplier | Amount (grams) |
|---|---|---|
| deionized water | — | 0.885 |
| imidazole | BASF | 0.075 |
| ethylene diamine tetraacetic acid | Dow Chemical Co. | 0.06 |
| PROJET YELLOW OAM dye* | Zeneca Colors | 7.5 |
| PROXEL GXL biocide | Zeneca Colors | 0.15 |
| sulfolane** | Phillips Petroleum Co. | 7.5 |
| formamide | Aldrich Chemical Co. | 4.5 |
| PROJET YELLOW OAM dye*** | Zeneca Colors | 0.33 |
| DOWANOL TPM | Dow Chemical Co. | 3 |
| 1,3,5-trioxane | Aldrich Chemical Co. | 6 |
| roll mill 30 minutes | | |

*containing 7.5 wt. % Acid Yellow 23 dye in water
**95 wt. % sulfolane, 5 wt. % water
***100 wt. % dye solids; oven stripped The resulting ink was filtered through a 1.2 micron filter. The ink exhibited a viscosity of 3.03 centipoise at 25° C., a pH of 7.4 at 25° C., a surface tension of 41.5 dynes per centimeter, and a conductivity of 3.43 millimhos.

The ink composition thus prepared was incorporated into a LEXMARK® 7200 thermal ink jet printer. Also incorporated into the printer was a black ink prepared as described in Example I. The black and yellow inks were used to generate adjacent black and yellow images on Courtland® 4224 DP paper. Intercolor bleed was measured as the average MFLEN (Mid Frequency Line Edge Noise, Horizontal lines) of the interface between the two inks. The average MFLEN was 10.6.

EXAMPLE IV

An ink composition was prepared by simple mixing of the following ingredients:

| Ingredient | Supplier | Amount (grams) |
|---|---|---|
| deionized water | — | 9 |
| tris(hydroxymethyl) aminomethane | American Biorganics | 0.25 |
| ethylene diamine tetraacetic acid | Dow Chemical Co. | 0.25 |
| PROJET YELLOW OAM dye* | Zeneca Colors | 40 |
| PROXEL GXL biocide | Zeneca Colors | 0.5 |
| 1,3,5-trioxane | Aldrich Chemical Co. | 5 |
| N-methyl pyrrolidinone | BASF | 5 |
| sulfolane** | Phillips Petroleum Co. | 15 |
| tetra(ethylene glycol) dimethyl ether | Aldrich Chemical Co. | 15 |
| DOWANOL TPM | Dow Chemical Co. | 10 |
| roll mill 30 minutes | | |

*containing 7.5 wt. % Acid Yellow 23 dye in water
**95 wt. % sulfolane, 5 wt. % water The resulting ink was filtered through a 1.2 micron filter. The ink exhibited a viscosity of 4.16 centipoise at 25° C., a pH of 7.25 at 25° C., a surface tension of 38.7 dynes per centimeter, and a conductivity of 3.13 millimhos.

The ink composition thus prepared was incorporated into a LEXMARK® 7200 thermal ink jet printer. Also incorporated into the printer was a black ink prepared by simple mixing of the following ingredients:

| Ingredient | Supplier | Amount (grams) |
|---|---|---|
| CABOJET® carbon black dispersion (15.4 wt. % solids) | Cabot Corp. | 43.38 |
| deionized water | — | 20 |
| benzyl methacrylate/polyethylene glycol methacrylate/methacrylic acid latex* | — | 3.88 |
| deionized water | — | 37.3 |
| TEGOPREN® 5884** | Goldschmidt Chemical Corp. | 5.98 |
| polyethylene oxide*** | Polysciences | 0.1 |
| sulfolane**** | Phillips Petroleum Co. | 6.32 |
| 2-pyrrolidinone | Aldrich Chemical Co. | 63.16 |
| deionized water | — | 19.88 |
| roll mill 30 minutes | | |

*acrylic resin emulsion comprising resins was derived from 23.6 percent by weight of methacrylic acid, 55.4 percent by weight of benzyl methacrylate, 21 percent by weight of polyethyleneglycol methacrylate ($M_w$ = 246), 3 percent by weight of dodecanethiol, and 1 percent by weight of carbon tetrabromide. A one liter kettle equipped with a mechanical stirrer was charged with 240 grams of water, 1.8 grams of sodium dodecylbenzene sulfonate (obtained from Rhone-Poulenc as Rhodacal Ds-10), and 2 grams of Triton X-100 (alkylphenoxypolyethanol, obtained from Aldrich Chemical Co.), and the mixture was stirred for 2 hours at about 100 rpm. To this solution were then added 1.8 grams of ammonium persulfate, followed by the addition of a mixture containing 28.3 grams of methacrylic acid, 66.5 grams of benzyl methacrylate, 25.2 grams of polyethyleneglycol methacrylate ($M_w$ = 246), 3.6 grams of dodecanethiol, and 1.2 grams of carbon tetrabromide. The mixture was heated to 80° C. for 6 hours. Thereafter, the resin emulsion was cooled to room temperature, and a sample (about 10 grams) was freeze dried and analyzed by GPC. The resin had a number average molecular weight of about 20,580 and a weight average molecular weight of about 8,193, with a polydispersity of 2.5.
**containing 33.5 wt. % solids of a polymer of the formula -continued

| Ingredient | Supplier | Amount (grams) |
|---|---|---|

$$H_3C-\underset{\underset{CH_3}{|}}{\overset{\overset{CH_3}{|}}{Si}}-O-\left[\underset{\underset{CH_2}{\underset{|}{CH_2}}}{\overset{\overset{CH_3}{|}}{Si}}-O\right]_n-\left[\underset{\underset{CH_2}{|}}{\overset{\overset{CH_3}{|}}{Si}}-O\right]_m-\underset{\underset{CH_3}{|}}{\overset{\overset{CH_3}{|}}{Si}}-CH_3$$

$$[O-C_2H_4]_{\overline{x}}-[O-C_3H_6]_{\overline{y}}-H$$

***bisphenol-A derivative, molecular weight 18,500, of the formula

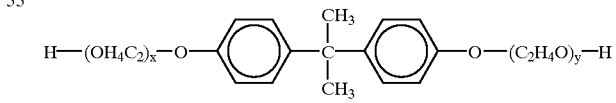

****95 wt. % sulfolane, 5 wt. % water

The resulting was filtered through a 1 micron filter. The ink exhibited a viscosity of 3.28 centipoise at 25° C., a pH of 7.1 at 25° C., a surface tension of 34.2 dynes percentimeter, and a conductivity of 0.692 millimhos.

The black and yellow inks were used to generate adjacent black and yellow images on Courtland® 4224 DP paper. Intercolor bleed was measured as the average MFLEN (<u>M</u>id <u>F</u>requency <u>L</u>ine <u>E</u>dge <u>N</u>oise, Horizontal lines) of the interface between the two inks. The average MFLEN was 10.6.

COMPARATIVE EXAMPLE A

An ink composition was prepared by simple mixing of the following ingredients:

| Ingredient | Supplier | Amount (grams) |
|---|---|---|
| PROJET YELLOW OAM dye* | Zeneca Colors | 24 |
| sulfolane** | Phillips Petroleum Co. | 9 |
| acetylethanolamine | Scher Chemical | 7.2 |
| butyl carbitol | Van Waters & Rogers | 7.2 |
| deionized water | — | 5.4 |
| DOWICIL® 150 biocide | Dow Chemical Co. | 0.06 |
| polyethylene oxide*** | Polysciences | 0.03 |
| roll mill 10 minutes | | |
| ethylene diamine tetraacetic acid | Dow Chemical Co. | 0.039 |
| imidazole | BASF | 0.6 |
| roll mill 10 minutes | | |
| urea | Arcadian Corp. | 3.6 |
| roll mill 10 minutes | | |
| deionized water | — | 2.871 |

*containing 7.5 wt. % Acid Yellow 23 dye in water
**95 wt. % sulfolane, 5 wt. % water
***bisphenol-A derivative, molecular weight 18,500, of the formula $$H-(OH_4C_2)_x-O-\langle\bigcirc\rangle-\underset{\underset{CH_3}{|}}{\overset{\overset{CH_3}{|}}{C}}-\langle\bigcirc\rangle-O-(C_2H_4O)_y-H$$

The resulting ink was filtered through a 1.2 micron filter. The ink exhibited a viscosity of 3.61 centipoise at 25° C., a pH of 8.27 at 21° C., a surface tension of 36.6 dynes per centimeter, and a conductivity of 4.25 millimhos.

The ink composition thus prepared was incorporated into a LEXMARK® 7200 thermal ink jet printer. Also incorporated into the printer was a black ink prepared as described in Example I. The black and yellow inks were used to generate adjacent black and yellow images on Courtland® 4224 DP paper. Intercolor bleed was measured as the average MFLEN (Mid Frequency Line Edge Noise, Horizontal lines) of the interface between the two inks. The average MFLEN was 54.

COMPARATIVE EXAMPLE B

An ink composition prepared as described in Comparative Example A was incorporated into a LEXMARK® 7200 thermal ink jet printer. Also incorporated into the printer was a black ink prepared as described in Example IV. The black and yellow inks were used to generate adjacent black and yellow images on Courtland® 4224 DP paper. intercolor bleed was measured as the average MFLEN (Mid Frequency Line Edge Noise, Horizontal lines) of the interface between the two inks. The average MFLEN was 37.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition comprising (a) water, (b) a colorant, and (c) 1,3,5-trioxane.

2. An ink composition according to claim 1 wherein the water is present in an amount of no more than about 80 percent by weight of the ink.

3. An ink composition according to claim 1 wherein the water is present in an amount of no more than about 60 percent by weight of the ink.

4. An ink composition according to claim 1 wherein the water is present in an amount of no more than about 50 percent by weight of the ink.

5. An ink composition according to claim 1 wherein the colorant is a dye.

6. An ink composition according to claim 1 wherein the colorant is a pigment.

7. An ink composition according to claim 1 wherein the colorant is a mixture of an anionic dye and a polyquaternary amine, and wherein the ink further contains a monomeric salt having at least one cation and at least one anion.

8. An ink composition according to claim 1 wherein the 1,3,5-trioxane is present in the ink in an amount of at least about 5 percent by weight of the ink and is present in the ink in an amount of no more than about 40 percent by weight of the ink.

9. An ink composition according to claim 1 wherein the 1,3,5-trioxane is present in the ink in an amount of at least about 10 percent by weight of the ink and is present in the ink in an amount of no more than about 30 percent by weight of the ink.

10. An ink composition according to claim 1 wherein the 1,3,5-trioxane is present in the ink in an amount of at least about 15 percent by weight of the ink and is present in the ink in an amount of no more than about 25 percent by weight of the ink.

11. An ink composition according to claim 1 further containing tripropylene glycol monomethyl ether.

12. An ink composition according to claim 1 further containing sulfolane.

13. An ink composition according to claim 1 further containing formamide.

14. A printing process that comprises (1) incorporating into an ink jet printing apparatus an ink composition according to claim 1, and (2) causing droplets of the ink to be ejected in an imagewise pattern onto a recording sheet.

15. A process according to claim 14 wherein the printing apparatus employs a thermal ink jet process wherein the ink in the nozzles is selectively heated in an imagewise pattern, thereby causing droplets of the ink to be ejected in imagewise pattern.

16. A process according to claim 14 wherein the printing apparatus employs an acoustic ink jet process, wherein droplets of the ink are caused to be ejected in imagewise pattern by acoustic beams.

17. A printing process that comprises (1) incorporating into an ink jet printing apparatus an ink composition comprising (a) water, (b) a colorant, and (c) 1,3,5-trioxane or tetraethylene glycol dimethyl ether, and (2) causing droplets of the ink to be ejected in an imagewise pattern onto a recording sheet, wherein the printing apparatus employs an acoustic ink jet process, wherein droplets of the ink are caused to be ejected in imagewise pattern by acoustic beams.

18. A process for reducing intercolor bleed in ink jet printing which comprises (1) incorporating into an ink jet printing apparatus a first ink composition of a first color comprising (a) water, (b) a colorant, and (c) 1,3,5-trioxane or tetraethylene glycol dimethyl ether, (2) incorporating into the ink jet printing apparatus a second ink composition of a color different from the first color and comprising (a) water, and (b) a pigment colorant, said second ink composition being substantially free of malonaldehyde bis (dimethylacetal), and (3) causing droplets of the first ink and the second to be ejected in an imagewise pattern onto a recording sheet, wherein at least some droplets of the first ink are ejected onto the recording sheet adjacent to at least some droplets of the second ink, and wherein intercolor bleed between the first ink and the second ink is reduced.

19. A process according to claim 18 wherein the colorant in the first ink is a dye.

20. A process according to claim 18 wherein the first ink contains 1,3,5-trioxane.

21. A process according to claim 18 wherein the first ink contains tetraethylene glycol dimethyl ether.

22. A process according to claim 18 wherein the first ink contains water in an amount of no more than about 80 percent by weight of the ink.

23. A process according to claim 18 wherein the first ink contains water in an amount of no more than about 60 percent by weight of the ink.

24. A process according to claim 18 wherein the first ink contains water in an amount of no more than about 50 percent by weight of the ink.

25. A process according to claim 18 wherein the first ink contains a pigment colorant.

26. A process according to claim 18 wherein the first ink contains a colorant which is a mixture of an anionic dye and a polyquaternary amine, and wherein the first ink further contains a monomeric salt having at least one cation and at Least one anion.

27. A process according to claim 18 wherein the first ink contains 1,3,5-trioxane or tetraethylene glycol dimethyl ether in an amount of at least about 5 percent by weight of the ink and wherein the first ink contains 1,3,5-trioxane or tetraethylene glycol dimethyl ether in an amount of no more than about 40 percent by weight of the ink.

28. A process according to claim 18 wherein the first ink contains 1,3,5-trioxane or tetraethylene glycol dimethyl ether in an amount of at least about 10 percent by weight of the ink and wherein the first ink contains 1,3,5-trioxane or tetraethylene glycol dimethyl ether in an amount of no more than about 30 percent by weight of the ink.

29. A process according to claim 18 wherein the first ink contains 1,3,5-trioxane or tetraethylene glycol dimethyl ether in an amount of at least about 15 percent by weight of the ink and wherein the first ink contains 1,3,5-trixoane or tetraethylene glycol dimethyl ether in an amount of no more than about 25 percent by weight of the ink.

30. A process according to claim 18 wherein the first ink further contains tripropylene glycol monomethyl ether.

31. A process according to claim 18 wherein the first ink further contains sulfolane.

32. A process according to claim 18 wherein the first ink further contains formamide.

* * * * *